(12) United States Patent
Kim

(10) Patent No.: US 11,921,936 B2
(45) Date of Patent: Mar. 5, 2024

(54) VEHICLE FUNCTION OPERATION APPARATUS AND METHOD

(71) Applicant: HYUNDAI MOBIS Co., Ltd., Seoul (KR)

(72) Inventor: Won Sik Kim, Gwangmyeong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/951,395

(22) Filed: Sep. 23, 2022

(65) Prior Publication Data

US 2023/0126180 A1  Apr. 27, 2023

(30) Foreign Application Priority Data

Oct. 22, 2021  (KR) .................. 10-2021-0142130
Oct. 22, 2021  (KR) .................. 10-2021-0142131

(51) Int. Cl.
*G06F 3/02*  (2006.01)
*B60K 35/00*  (2006.01)
*G06F 3/04817*  (2022.01)

(52) U.S. Cl.
CPC ............... *G06F 3/02* (2013.01); *B60K 35/00* (2013.01); *G06F 3/04817* (2013.01); *B60K 2370/126* (2019.05); *B60K 2370/143* (2019.05); *B60K 2370/152* (2019.05); *B60K 2370/34* (2019.05)

(58) Field of Classification Search
CPC ....... G06F 3/02; G06F 3/04817; B60K 35/00; B60K 2370/126; B60K 2370/143; B60K 2370/152; B60K 2370/34
See application file for complete search history.

(56) References Cited

U.S. PATENT DOCUMENTS

| | | | |
|---|---|---|---|
| 10,705,629 B1* | 7/2020 | Arnold | G06F 3/03547 |
| 2015/0070319 A1* | 3/2015 | Pryor | G06V 20/56 345/175 |
| 2018/0154774 A1* | 6/2018 | Park | G06F 3/017 |
| 2018/0370365 A1* | 12/2018 | Lee | B60K 37/06 |
| 2018/0373350 A1* | 12/2018 | Rao | B60K 35/00 |
| 2020/0142529 A1* | 5/2020 | Nugraha | G06F 3/044 |
| 2020/0174587 A1 | 6/2020 | Park | |
| 2020/0189392 A1 | 6/2020 | Sung et al. | |
| 2020/0189520 A1 | 6/2020 | Chung et al. | |
| 2020/0398702 A1 | 12/2020 | Prozzi et al. | |
| 2021/0039496 A1* | 2/2021 | Sung | G10L 15/22 |
| 2022/0035477 A1* | 2/2022 | Holmgren | G06F 3/0488 |
| 2022/0111731 A1* | 4/2022 | Zhao | G06F 3/0446 |
| 2022/0118853 A1* | 4/2022 | Chung | G06F 3/038 |
| 2022/0134884 A1* | 5/2022 | Chung | B60H 1/0065 345/184 |

* cited by examiner

*Primary Examiner* — Christopher E Leiby
(74) *Attorney, Agent, or Firm* — Morgan, Lewis & Bockius LLP

(57) ABSTRACT

A vehicle function operation apparatus according to one embodiment of the present invention includes a matching table configured to display an icon for each of various in-vehicle functions for each area, and a position variable knob dial electrically linked when coming into contact with the matching table to project a widget for each detailed function of the corresponding icon positioned on a contact area with the matching table.

18 Claims, 20 Drawing Sheets

VEHICLE FUNCTION OPERATION APPARATUS AND METHOD

CROSS-REFERENCE TO RELATED APPLICATION

This application claims priority to and the benefit of Korean Patent Application No. 10-2021-0142130, filed on Oct. 22, 2021, and Korean Patent Application No. 10-2021-0142131, filed on Oct. 22, 2021, the disclosure of which are incorporated herein by reference in its entirety.

BACKGROUND

1. Field of the Invention

The present invention relates to a vehicle function operation apparatus and method.

2. Discussion of Related Art

In general, with the development of vehicles, a structure of a cockpit in the vehicle tends to gradually diversify, and not only various convenient functions in a cockpit module but also a method of operating the corresponding functions are variously provided for each vehicle.

For example, when convenience devices in the cockpit module are operated, so far, a touch-type display using an audio video navigation (AVN) system or the like or a hard-type button-type switch are universally applied, and operations of recent air conditioners are implemented as a touch type composed of a separate display device.

However, the method of operating the device only provides a limited general structure, which is limited in terms of design and disappointed in terms of convenience.

In particular, there is a problem in that since most of the conventional operation packages are driver-centered as part of increasing ease of use while traveling, the ease of use is rather reduced when considering various traveling modes in autonomous vehicles such as a purpose-built vehicle (PBV).

SUMMARY OF THE INVENTION

The present invention has been proposed to solve the above-described problems, and is directed to providing a vehicle function operation apparatus and method capable of satisfying a condition for each of various traveling modes of occupants in an autonomous traveling environment of a vehicle (e.g., PBV).

The object of the present invention is not limited to the above-mentioned objects, and other objects not mentioned herein will be clearly understood by those skilled in the art from the following description.

A vehicle function operation apparatus according to one embodiment of the present invention includes a matching table configured to display an icon for each of various in-vehicle functions for each area in the matching table; and a position variable knob dial electrically linked when coming into contact with the matching table to project a widget for each detailed function of the corresponding icon positioned on a contact area with the matching table.

Here, the matching table may include a monitoring sensor configured to partition an area for each icon on an upper end surface of the matching table.

The knob dial may be positioned in a preset mounting area in a vehicle, may come into contact with the matching table after being removed from the mounting area, and may be mounted on and stored in the mounting area when a linkage with the matching table is deactivated.

The knob dial may have a built-in battery having a predetermined capacity to be wirelessly charged when the knob dial is mounted on the mounting area.

The knob dial may be provided with a non-slip pad capable of preventing slippage on a lower end surface of a housing.

The knob dial may include a dial unit configured to enable a detailed function operation of the corresponding icon displayed on the matching table in a touch and rotation manner, a housing configured to surround a lower portion of the dial unit, and a linkage switch positioned on a lower end of the housing to determine the linkage between the matching table and the knob dial depending on whether the knob dial comes into contact with the matching table.

The dial unit may include a touch portion configured to physically enable a depressing operation, and a dial portion configured to enable rotation in a state of surrounding an outer circumferential surface of the touch portion.

Here, the dial portion may project a widget for each detailed function of the corresponding icon displayed on the matching table.

The dial unit may include a touch portion configured to physically enable a depressing operation, and a dial portion configured to enable rotation in a state of surrounding an outer circumferential surface of the touch portion.

In this case, the dial unit may include a projection module configured to project the widget for each detailed function of the corresponding icon displayed on the matching table, and an around slit disposed along an outer circumferential surface so that a beam of the projector module may be projected over the entire area of the matching table.

The projector module may project a plurality of widgets by arranging the plurality of widgets in a straight or curved shape.

The matching table may selectively display an illumination for each position and function based on a backlight over the entire area of the matching table. The matching table may activate a backlight illumination only for the corresponding icon of an area where the knob dial is positioned, and deactivate backlight illuminations for the remaining icons when coming into contact with the knob dial.

A vehicle function operation apparatus according to another embodiment of the present invention includes a matching table configured to display an icon for each of various in-vehicle functions for each area of the matching table, and a position variable knob dial electrically linked when coming into contact with the matching table to project a widget for each detailed function of the corresponding icon positioned on a contact area with the matching table.

At this time, the knob dial may be positioned on a preset mounting area in a vehicle, may come into contact with the matching table after being removed from the mounting area, and may be mounted on and stored in the mounting area when a linkage with the matching table is deactivated.

The matching table may display only the corresponding icon of an area where the knob dial is positioned with a different color when coming into contact with the knob dial.

The mounting area may be positioned at any one place among a console, a door trim, and a crash pad in the vehicle.

The knob dial may include a dial unit configured to enable a detailed function operation of the corresponding icon displayed on the matching table in a touch and rotation manner, a housing configured to surround a lower portion of the dial unit, and a linkage switch positioned on a lower end of the housing to determine a linkage between the matching table and the knob dial depending on whether the knob dial comes into contact with the matching table.

The dial unit may include a touch portion configured to physically enable a depressing operation, and a dial portion configured to enable rotation in a state of surrounding an outer circumferential surface of the touch portion.

The dial portion may include a projection module configured to project the widget for each detailed function of the corresponding icon displayed on the matching table, and an around slit disposed along an outer circumferential surface so that a beam of the projector module may be projected over the entire area of the matching table.

Meanwhile, a vehicle function operation method according to one embodiment of the present invention includes (a) an operation in which a position variable knob dial comes into contact with a matching table configured to display an icon for each of various in-vehicle functions for each area to be electrically linked with the matching table, and (b) an operation in which the knob dial linked with the matching table projects a widget for each detailed function of the corresponding icon positioned on a contact area with the matching table.

The operation (a) may include a knob dial separating operation of removing the knob dial mounted on a preset mounting area in a vehicle from the mounting area, and a knob dial connecting operation of bringing the knob dial separated from the mounting area into contact with the matching table to electrically link the knob dial with the matching table.

Here, in the knob dial separating operation, the knob dial may be removed from the mounting area in a state in which a power source between the mounting area and the knob dial has been deactivated.

In the knob dial connecting operation, the knob dial may be changed to a preset backlight color when the knob dial is linked with the matching table. At this time, the setting that changes the knob dial to the corresponding backlight color is possible as an option.

The operation (b) may include an operation of selecting a projection type of a straight or curved shape for the widget for each detailed function of the corresponding icon displayed on the matching table, and an operation of selecting the widget for each detailed function of the icon and selectively controlling the corresponding function by the operation of the knob dial operated in a touch and rotation manner.

According to the present invention, a vehicle function operation apparatus and method can satisfy the condition for each of various traveling modes of occupants in an autonomous traveling environment of a vehicle.

In particular, the present invention is significant in that a new operation concept that may be linked with a console and/or a separate table applied to a vehicle is implemented.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving them will be made clear from embodiments described in detail below with reference to the accompanying drawings. However, the present invention is not limited to embodiments disclosed below but will be implemented in various different forms, and these embodiments are only provided so that the disclosure of the present invention will be thorough and complete and will fully convey the scope of the present invention to those skilled in the art to which the present invention pertains, and the present invention is defined by the description of the claims. Meanwhile, terms used herein are for the purpose of describing the embodiments and are not intended to limit the present invention. In the present specification, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices. As used in the present specification, the term "and/or" includes any one of the corresponding listed items and all combinations of one or more of them.

Hereinafter, embodiments of the present invention will be described in detail with reference to the accompanying drawings.

DESCRIPTION OF TERMS

In the present invention, terms from an upper concept to a lower concept of a symbol are used in the order of 'icon-widget-mark' for convenience of description.

For example, assuming that there is an icon A, which is a switch for any one function among various functions of a vehicle, a symbol displayed when the icon A is selected is expressed as a 'widget', and a symbol displayed when the widget is selected is expressed as a 'mark'.

First Embodiment (FIGS. 1 to 12

FIGS. 1 to 12 show a vehicle function operation apparatus according to a first embodiment of the present invention.

Figure 1:
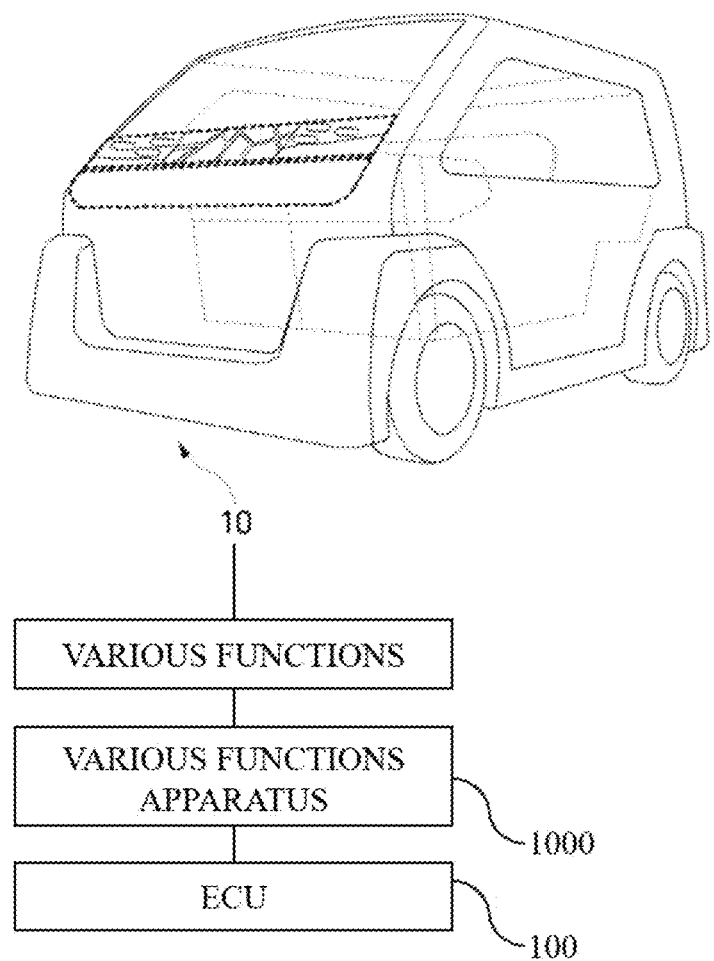
FIG. 1 is a view for basically describing a vehicle function operation apparatus according to a first embodiment of the present invention.

Referring to FIG. 1, a vehicle function operation apparatus 1000 functions as a controller configured to operate various functions of a vehicle 10. The vehicle function operation apparatus 1000 may be controlled by an electronic control unit (ECU) 100.

As part of satisfying the user's behavioral conditions in the autonomous traveling environment, the vehicle function operation apparatus 1000 configures a separate position variable operation system in order to apply various traveling modes.

Figure 2:
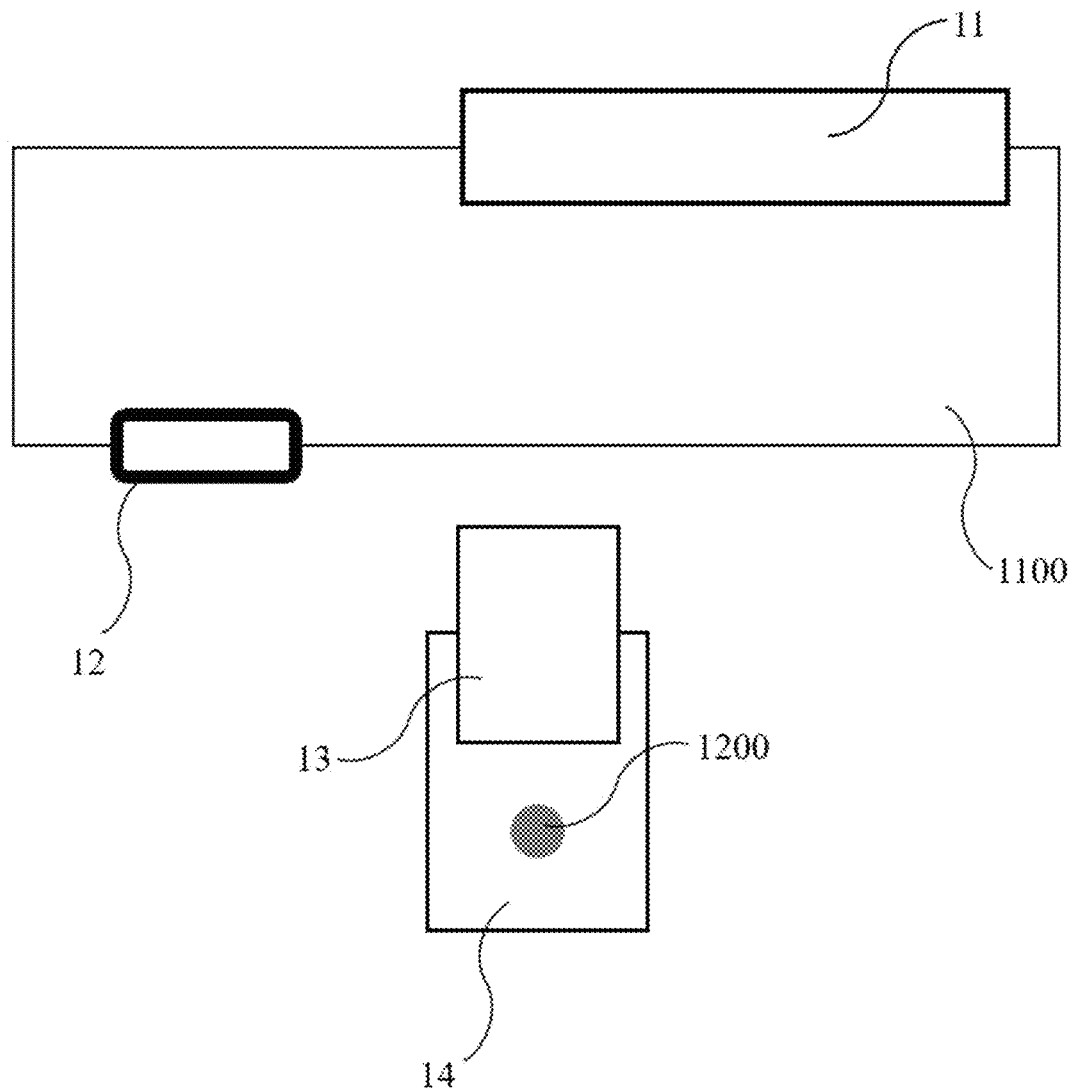
FIG. 2 is a configuration view schematically showing the vehicle function operation apparatus according to the first embodiment of the present invention.

Referring to FIG. 2, the vehicle function operation apparatus 1000 largely includes a matching table 1100 and a position variable knob dial 1200.

The matching table 1100 functions as a control panel configured to display icons for each of various in-vehicle functions. Basically, the matching table 1100 is positioned between a display 11 and a steering wheel 12 on the cockpit module as shown, but is not limited thereto and may be positioned in any area in the vehicle.

For example, the matching table 1100 may be positioned on a side door trim or a separate table (not shown) accommodated in the vehicle to provide an environment in which not only a driver, but also other occupants may easily operate in-vehicle functions.

The knob dial 1200 is electrically linked with the icon displayed on the matching table 1100 to enable a detailed function operation of the corresponding icon.

When the knob dial 1200 is mounted in a console 14, overall in-vehicle system management (various convenience functions, traveling control, and the like) is possible through a basic dial operation. Here, the knob dial 1200 may be simply mounted or configured as a pop-up type.

Basically, the knob dial 1200 is detachably mounted in the console 14 linked with a main operation system 13, but has a variable position structure linked with the matching table 1100 outside a mounting area when necessary.

In particular, the knob dial 1200 has various usability in that it may be positioned in any area in the vehicle including a crash pad and a door trim in addition to the shown console 14.

Figure 3:
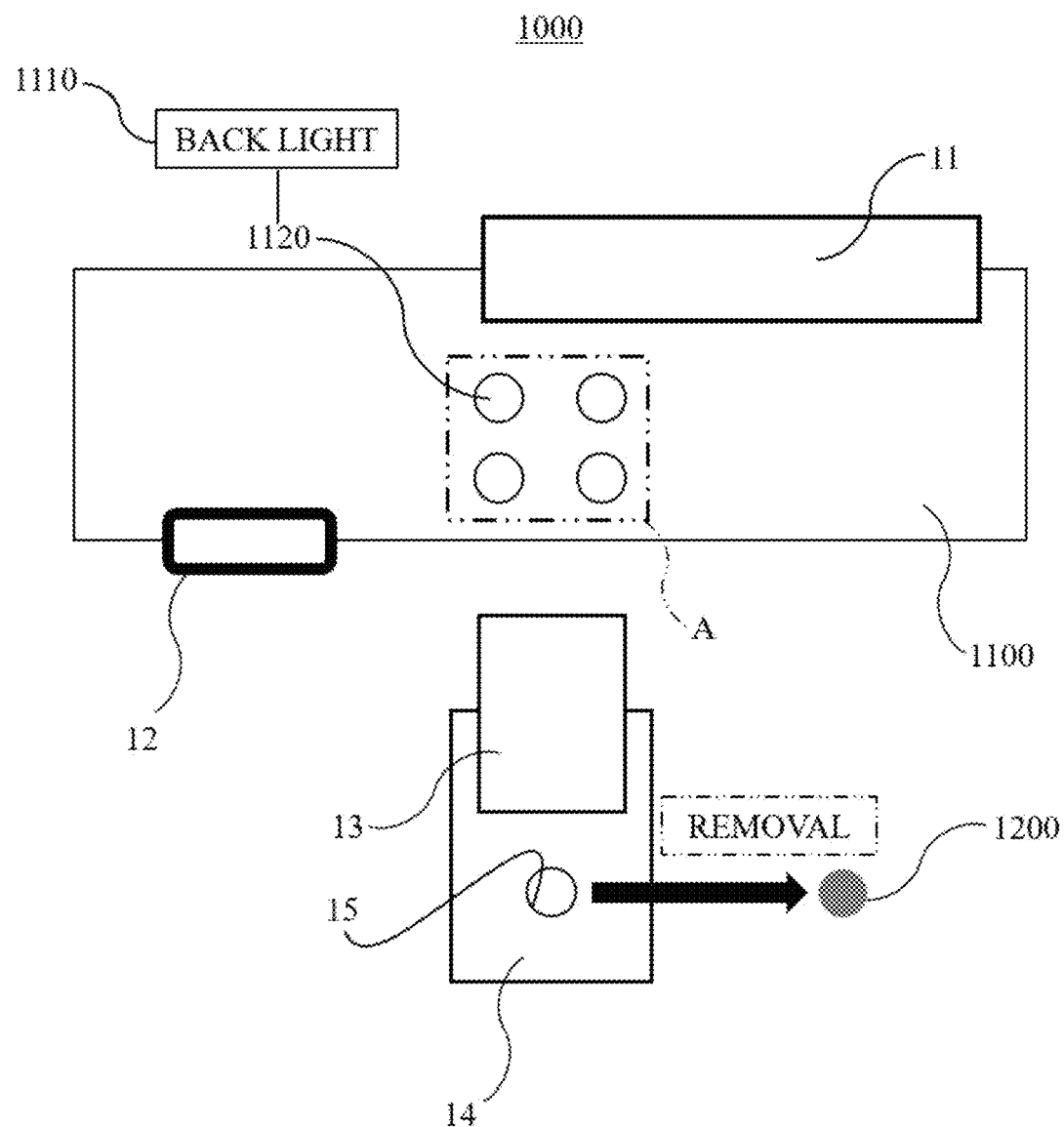
FIG. 3 is an operation exemplary view schematically showing the vehicle function operation apparatus according to the first embodiment of the present invention.
Figure 4:
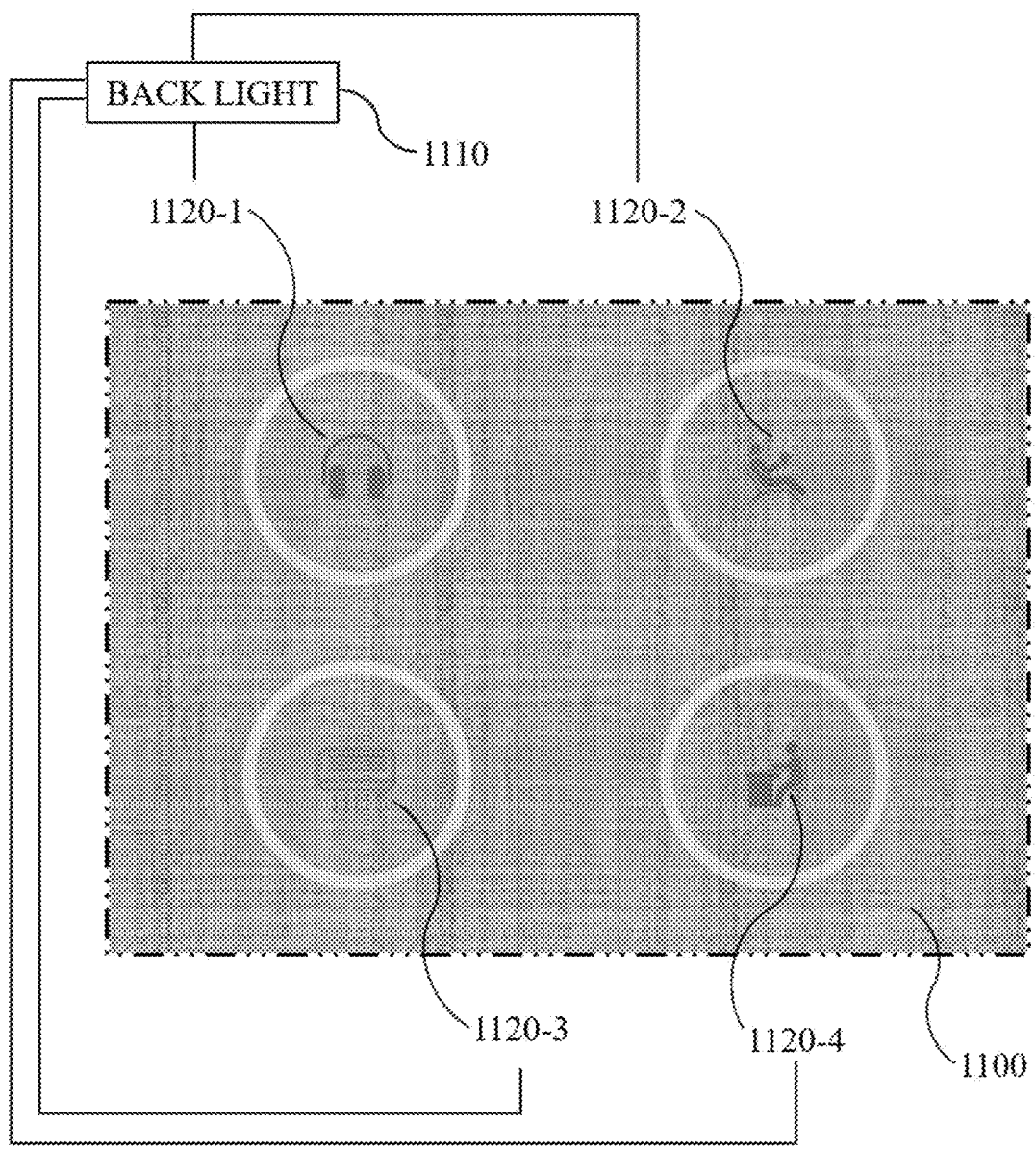
FIG. 4 is an enlarged view of portion A indicated in FIG. 3.

Referring to FIGS. 3 and 4, the matching table 1100 selectively displays lighting for each position and function based on a backlight 1110 in the entire area.

For example, basic settings of the matching table 1100 automatically turns on a backlight illumination of an icon 1120 when the knob dial 1200 is removed from a mounting area 15. In other words, when the knob dial 1200 is mounted on the mounting area 15, the icon 1120 of the matching table 1100 may be in a state in which the backlight illumination is turned off.

As shown in FIG. 4, icons 1120-1, 1120-2, 1120-3, and 1120-4 for each function are displayed on the matching table 1100, but positions of the icons 1120-1, 1120-2, 1120-3, and 1120-4 for each function shown are only one example, and the user may selectively change or modify and/or change the position of the icon 1120.

For example, when the knob dial 1200 comes into contact with a specific icon 1120-1, the backlight illumination of the remaining icons 1120-2, 1120-3, and 1120-4 may be turned off in the settings. In other words, the backlight illumination of the icons 1120-1, 1120-2, 1120-3, and 1120-4 for each function may be selectively turned on/off according to the settings.

At this time, the matching table 1100 may also turn on/off the backlight illumination of the icon 1120 by setting a separate option regardless of whether the knob dial 1200 is detached from the mounting area 15.

The matching table 1100 may partition a display position of the icon 1120 for each preset area. Here, the preset area means preset display positions of various icons 1120 functioning as a switch of each function in order to easily control various functions of the vehicle.

The matching table 1100 may arbitrarily display the position of the icon 1120 by operating the knob dial 1200. In this case, the matching table 1100 may highlight only the selected specific icon 1120-1 to increase or decrease a brightness value compared to a default value in a state of illuminating all the icons 1120-1, 1120-2, 1120-3, and 1120-4 with the backlight at the default brightness.

Figure 5:
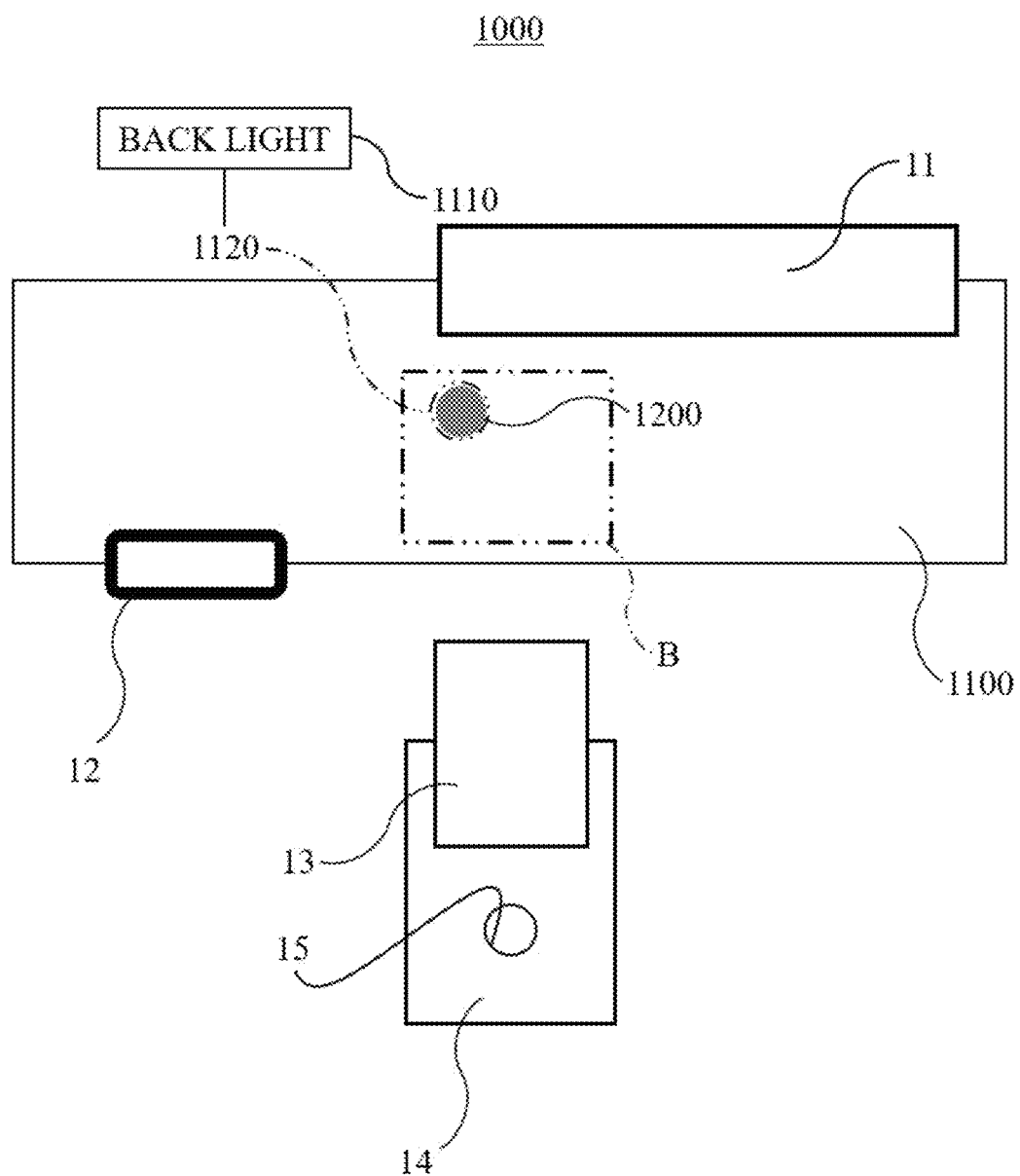
FIG. 5 is an operation exemplary view schematically showing a state in which a matching table and a knob dial are linked in the vehicle function operation apparatus according to the first embodiment of the present invention.
Figure 6:
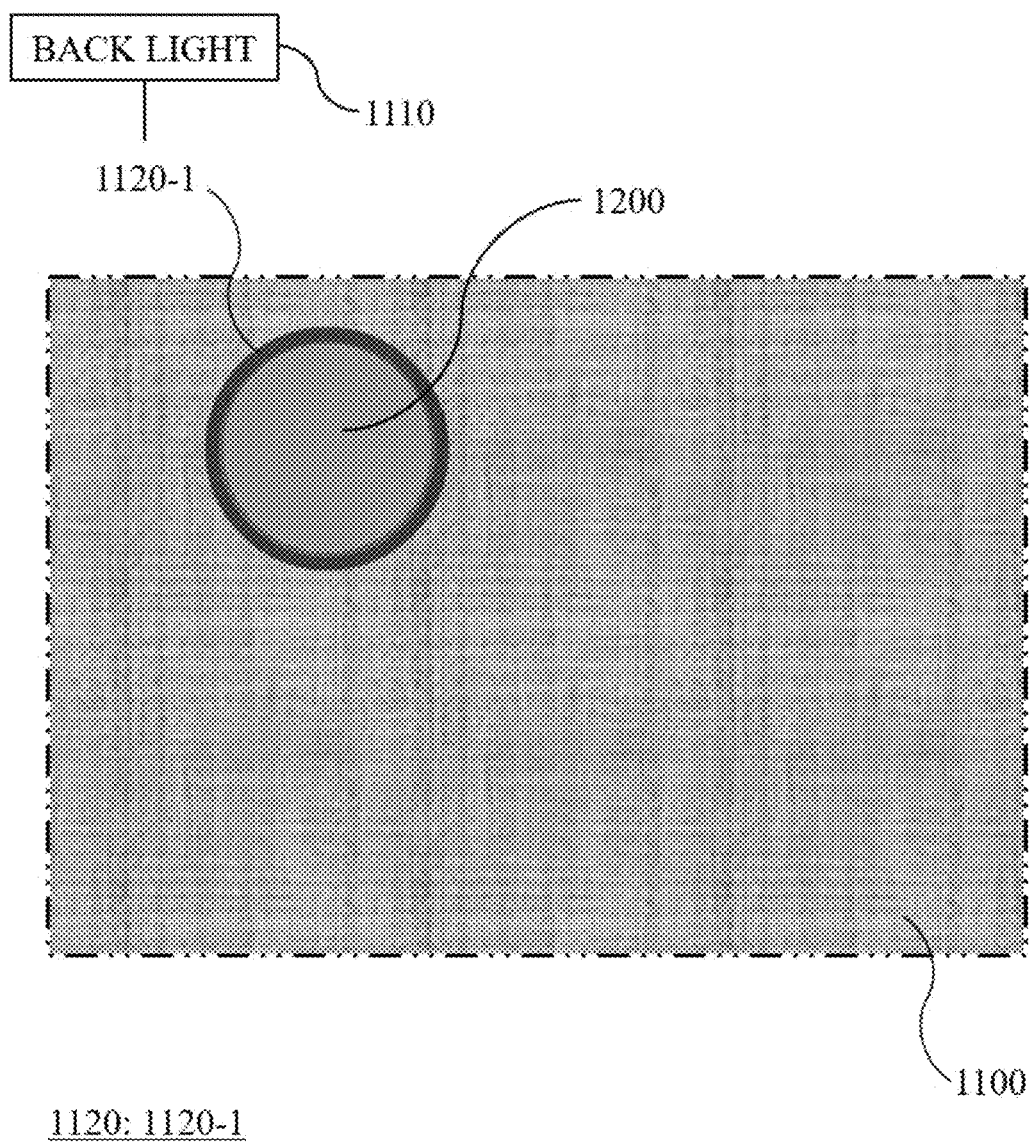
FIGS. 6 to 8 are operation exemplary views of the matching table and the knob dial shown based on portion B indicated in FIG. 5.

Referring to FIGS. 5 and 6, when the matching table 1100 comes into contact with the knob dial 1200, only the corresponding icon 1120-1 of the area where the knob dial 1200 is positioned is displayed and the remaining icons are hidden. In other words, the backlight illumination is turned on for only the corresponding icon 1120-1 of the matching table 1100 linked with the knob dial 1200, and the backlight illumination is turned off for the remaining icons for convenience. At this time, the knob dial 1200 linked with the matching table 1100 may also be changed to a specific color in order to confirm an identification with a naked eye. This is to confirm with the naked eye that the knob dial 1200 and the matching table 1100 have been linked. The color of the knob dial 1200 may be selectively changed.

Figure 7:
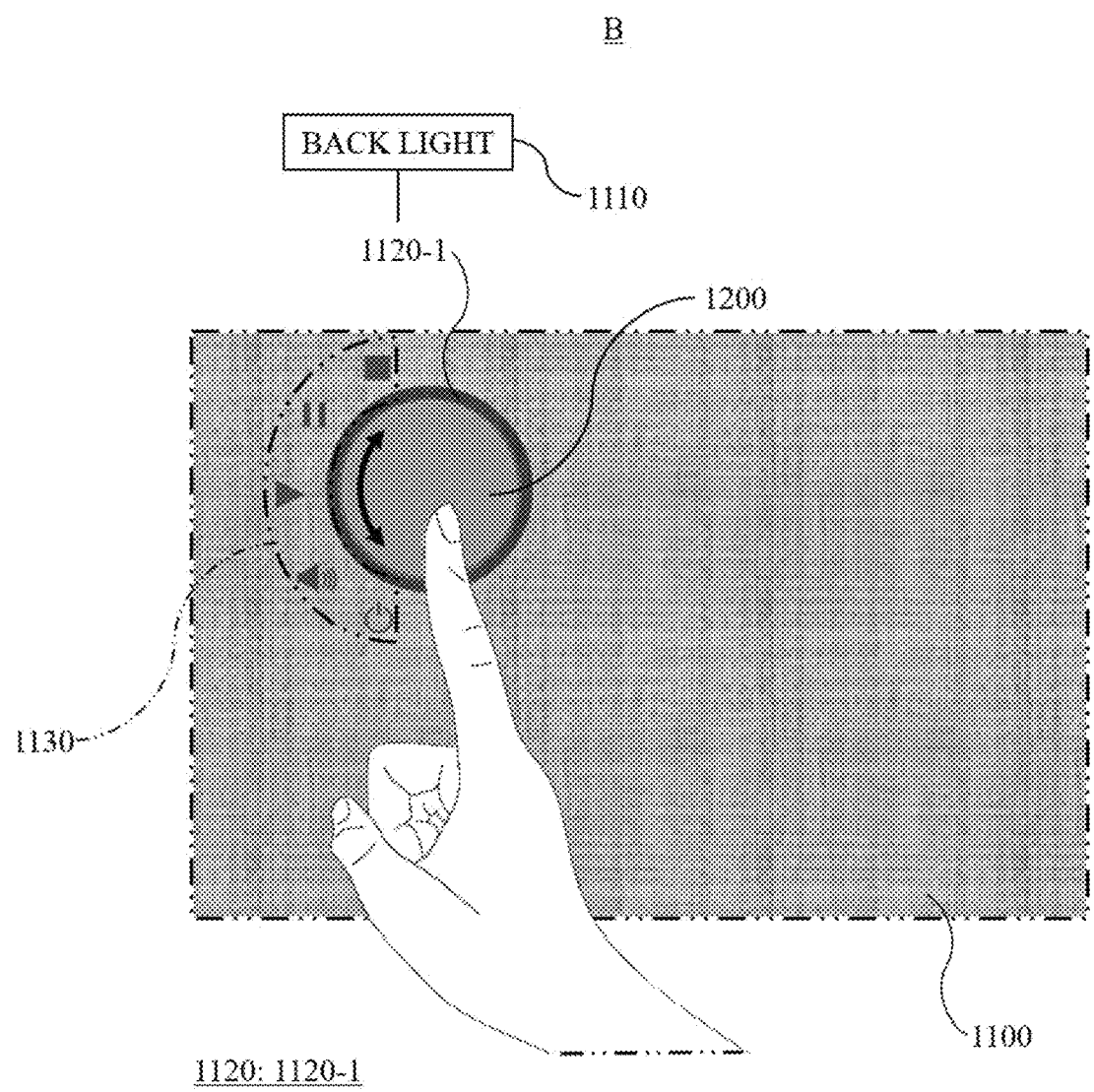

Referring to FIG. 7, when the knob dial 1200 comes into contact with the area of the specific icon 1120-1 of the matching table 1100, the matching table 1100 and the knob dial 1200 are electrically linked with each other. In this case, as described above, the illumination of a backlight 1110 for the knob dial 1200 and the specific icon 1120-1 is turned on to identify the linkage confirmation.

At the same time, the matching table 1100 displays (turns on the backlight) a widget 1130 for each detailed function of the specific icon 1120-1 around the knob dial 1200 linked with the specific icon 1120-1. Each widget 1130 may be selected according to a rotation operation of the knob dial 1200, and the knob dial 1200 is turned on as a switch to implement an operation function. Accordingly, the corresponding function of the selected widget 1130 may be performed by touching the knob dial 1200.

When there is a detailed function of the selected widget 1130, a mark (not shown) governing the detailed function of the corresponding widget 1130 is displayed on the matching table 1100 by the first touch of the knob dial 1200, and when the knob dial 1200 is touched once more, the function of the corresponding mark may be performed.

Here, the matching table 1100 may arbitrarily display a position of the mark by operating the knob dial 1200.

Figure 8:
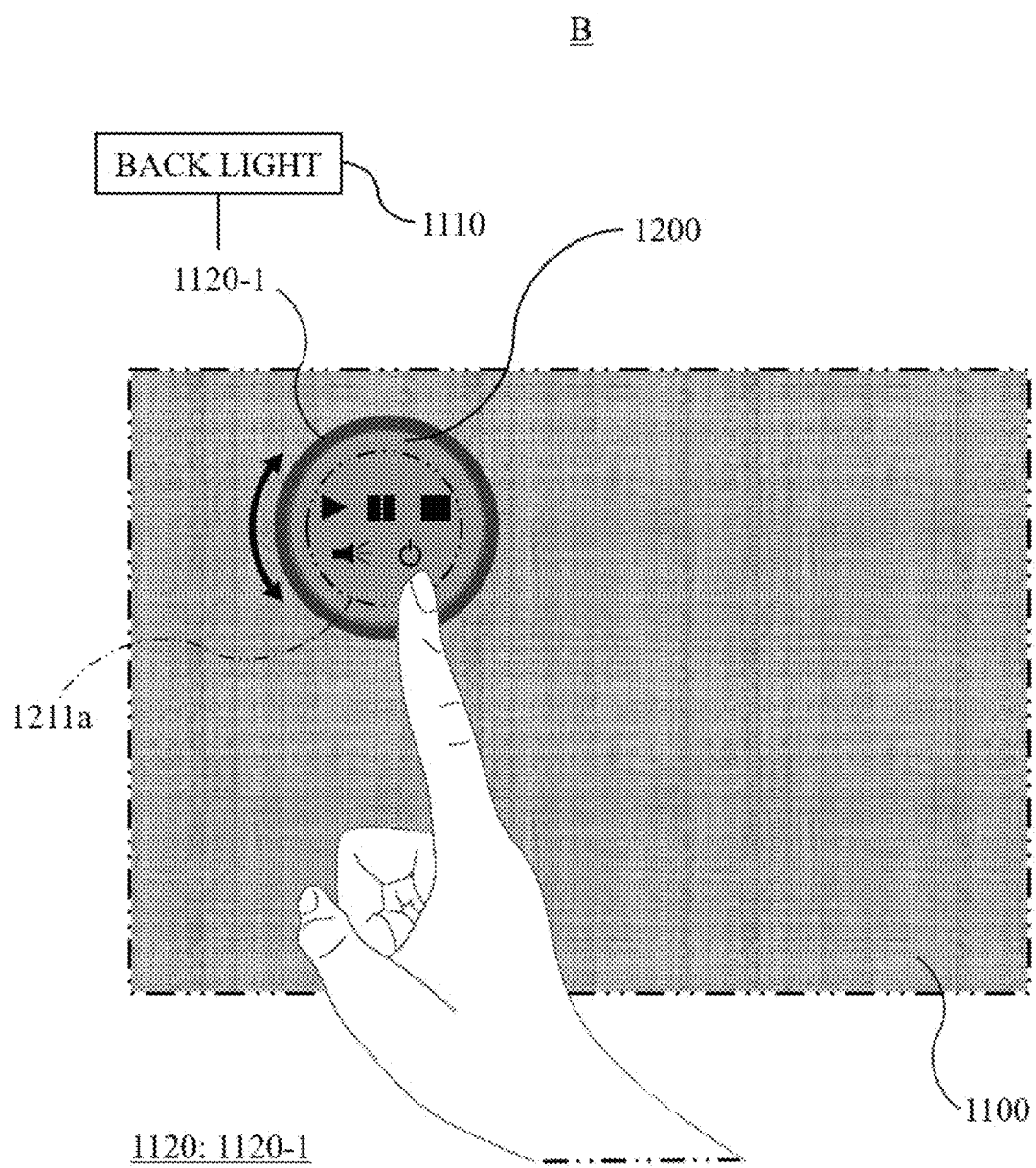

Referring to FIG. 8, separately from the widget (1130 in FIG. 7) displayed on the matching table 1100, the knob dial 1200 may display a widget 1211*a* for each detailed function of the selected specific icon 1120-1 on a touch area (e.g., a light emitting diode (LED) panel, hereinafter referred to as a "touch portion").

Here, the matching table 1100 may display the mark for each detailed function of the widget 1211*a* displayed on the knob dial 1200 around the knob dial 1200.

As another example, when the user selects one of the widgets 1211*a* displayed on the knob dial 1200, the corresponding mark is not displayed on the matching table 1100, and the corresponding mark may be displayed on the touch area of the knob dial 1200.

Figure 9:
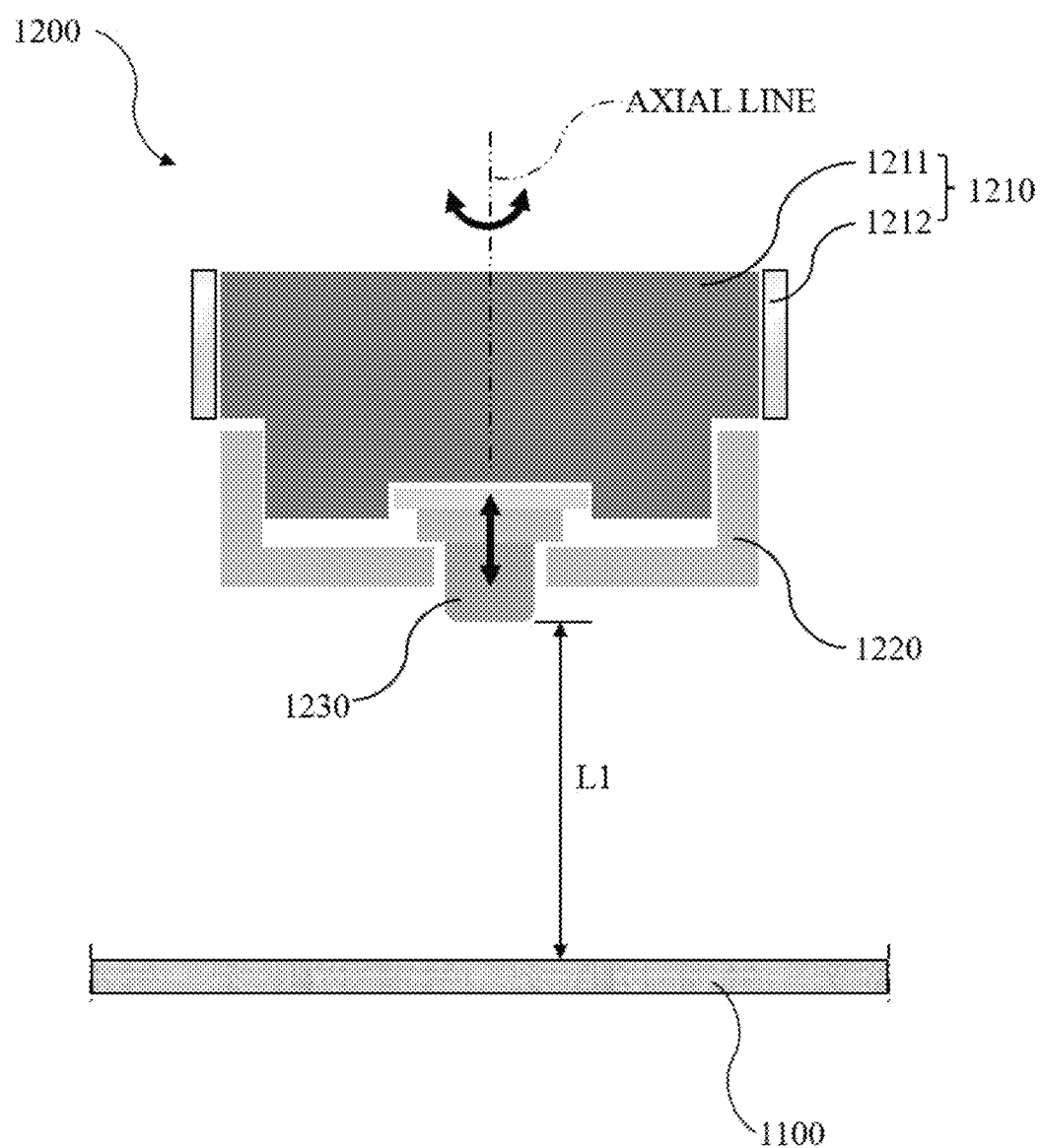
FIGS. 9 to 11 are cross-sectional configuration views schematically showing a process in which the matching table and the knob dial are linked in the vehicle function operation apparatus according to the first embodiment of the present invention.

Referring to FIG. 9, the knob dial 1200 includes a dial unit 1210, a housing 1220, and a linkage switch 1230.

The dial unit 1210 enables a detailed function operation of the corresponding icon displayed on the matching table 1100 in a touch and rotation manner.

To this end, the dial unit 1210 includes a touch portion 1211 and a dial portion 1212.

The touch portion 1211 functions as a switch that physically enables a depressing operation. The touch portion 1211 may be changed to a preset backlight color when the knob dial 1200 is linked with the matching table 1100.

In addition, the touch portion 1211 may also display the corresponding widget on the touch area separately from a widget for each detailed function of the icon displayed on the matching table 1100.

The dial portion 1212 may rotate and select the widget for each detailed function of the selected icon displayed on the matching table 1100 while surrounding an outer circumferential surface of the touch portion 1211. Of course, the dial portion 1212 may also rotate and select the widgets displayed on the touch portion 1211.

A corresponding function of the widget selected through the dial portion 1212 may be performed by the depressing operation of the touch portion 1211.

Subsequently, the housing 1220 surrounds a lower portion of the dial unit 1210. A non-slip pad capable of preventing slippage may be provided on a lower end surface of the housing 1220.

The linkage switch 1230 is positioned by passing through a center of a lower end of the housing 1220 to determine the linkage between the matching table 1100 and the knob dial 1200 depending on whether the matching table 1100 and the knob dial 1200 come into contact with each other. The linkage switch 1230 may be a tact switch.

Meanwhile, the knob dial 1200 removed from the mounting area adopts a direct contact method for electrical linkage with the matching table 1100.

Figure 10:
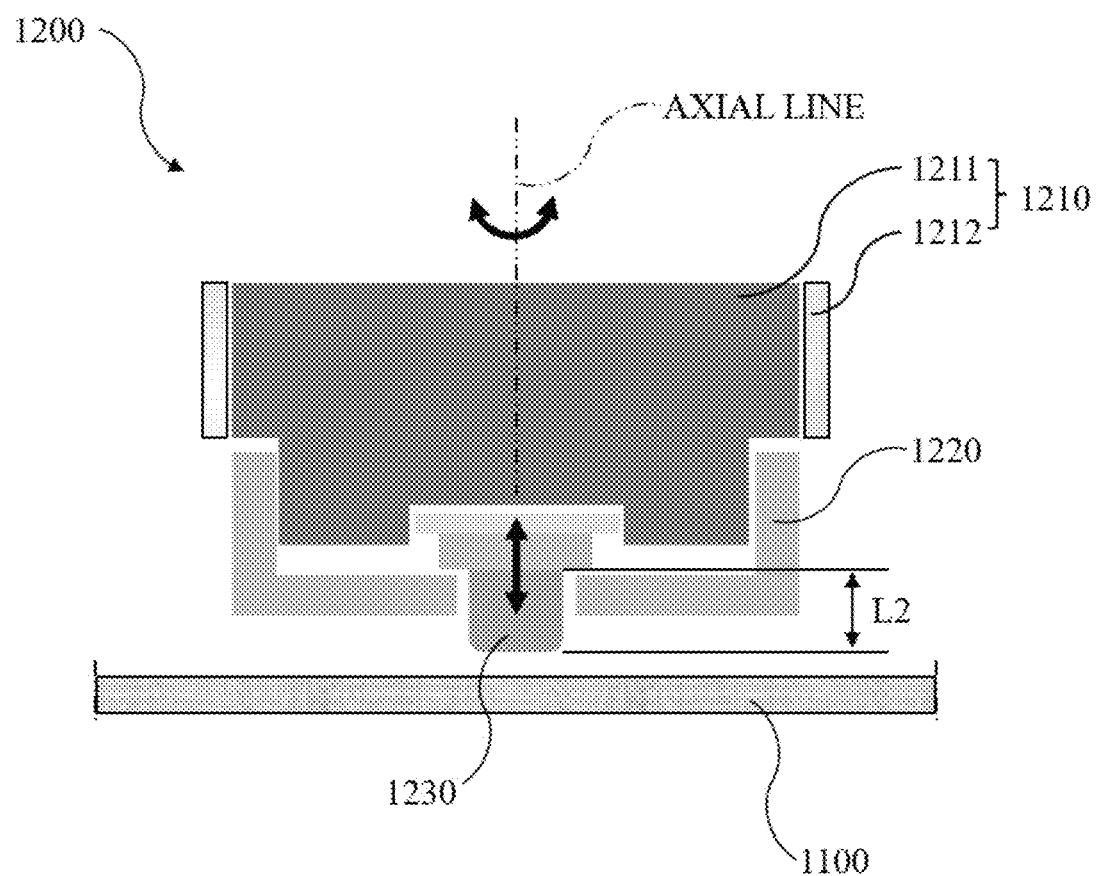

To this end, an interval L1 between the linkage switch 1230 and the matching table 1100 in FIG. 9 and an interval L2 between the linkage switch 1230 and the matching table 1100 in FIG. 10 means that the knob dial 1200 and the matching table 1100 are not in direct contact with each other, so that the knob dial 1200 and the matching table 1100 are not in a state of being linked with each other.

Figure 11:
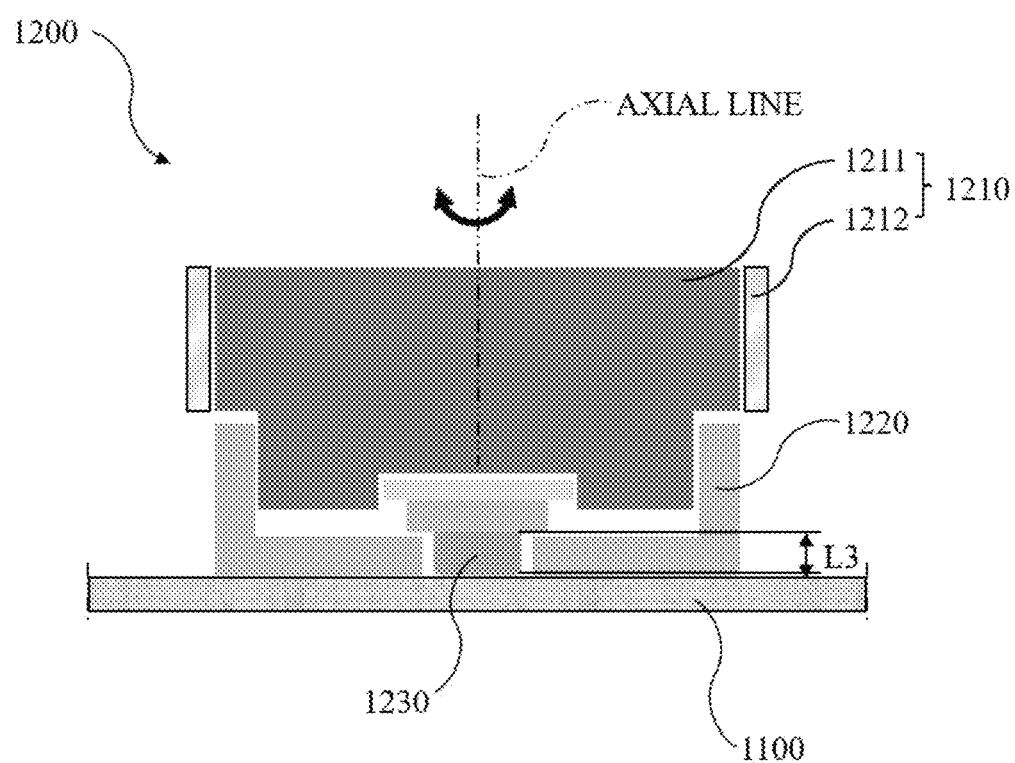

On the other hand, as shown in FIG. 11, when the linkage switch 1230 comes into contact with the matching table 1100 with an interval L3 held after the linkage switch 1230 is physically depressed, the knob dial 1200 and the matching table 1100 are in a state of being electrically linked.

At this time, the touch portion 1211 functions as a trigger that performs the functions of the icons, widgets, and marks displayed on the matching table 1100 through the physical depressing operation, and as another example, may also function as a trigger that performs the functions of the widgets and marks displayed on the touch portion 1211.

The dial portion 1212 may rotate along the outer circumferential surface of the touch portion 1211 with respect to an axial line to select icons, widgets, and marks.

Figure 12:
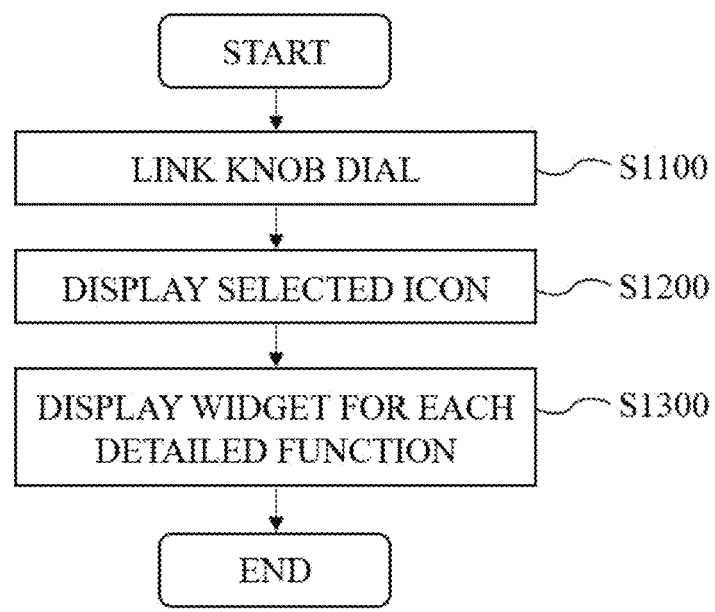
FIG. 12 is a flowchart showing a vehicle function operation method according to the first embodiment of the present invention.

Referring to FIG. 12, a vehicle function operation method largely includes a knob dial linking operation (S1100), a selected icon displaying operation (S1200), and an operation of displaying a widget for each detailed function (S1300).

In the knob dial linking operation (S1100), the position variable knob dial and the matching table that displays icons for each of various functions in the vehicle are linked.

The knob dial linking operation (S1100) may include a knob dial separating operation (S1110) and a knob dial connecting operation (S1120).

In the knob dial separating operation (S1110), the knob dial mounted on the preset mounting area in the vehicle is removed from the mounting area. When the knob dial is removed from the mounting area, the matching table turns on the backlight illumination to display the icons for each of various functions of the vehicle. Here, in the knob dial separating operation (S1110), the knob dial may be removed from the mounting area in a state in which a power source between the mounting area and the knob dial has been deactivated.

In the knob dial connecting operation (S1120), the knob dial removed (separated) from the mounting area is brought into contact with the matching table to electrically link the knob dial with the matching table.

In the knob dial connecting operation (S1120), when the knob dial is linked with the matching table, the knob dial may be changed to a preset backlight color. At this time, the setting that changes the knob dial to the corresponding backlight color is possible as an option.

Next, in the selected icon displaying operation (S1200), only the corresponding icon of the area where the knob dial is positioned is displayed on the matching table linked with the knob dial.

The selected icon displaying operation (S1200) includes a backlight hidden illuminating operation (S1210) of displaying only the corresponding icon in the area where the knob dial is positioned on the matching table and hiding the remaining icons when the knob dial comes into contact with the matching table.

Next, in the operation of displaying the widget for each detailed function (S1300), the widget for each detailed function of the corresponding icon is displayed around the icon on the matching table where the knob dial is positioned according to the operation of the knob dial.

In the operation of displaying the widget for each detailed function (S1300), the widget for each detailed function of the icon is selected by the operation of the knob dial operated in a touch and rotation manner, so that it is possible to selectively control the corresponding function.

Second Embodiment (FIGS. 13 to 20

FIGS. 13 to 20 show a vehicle function operation apparatus according to a second embodiment of the present invention.

Figure 13:
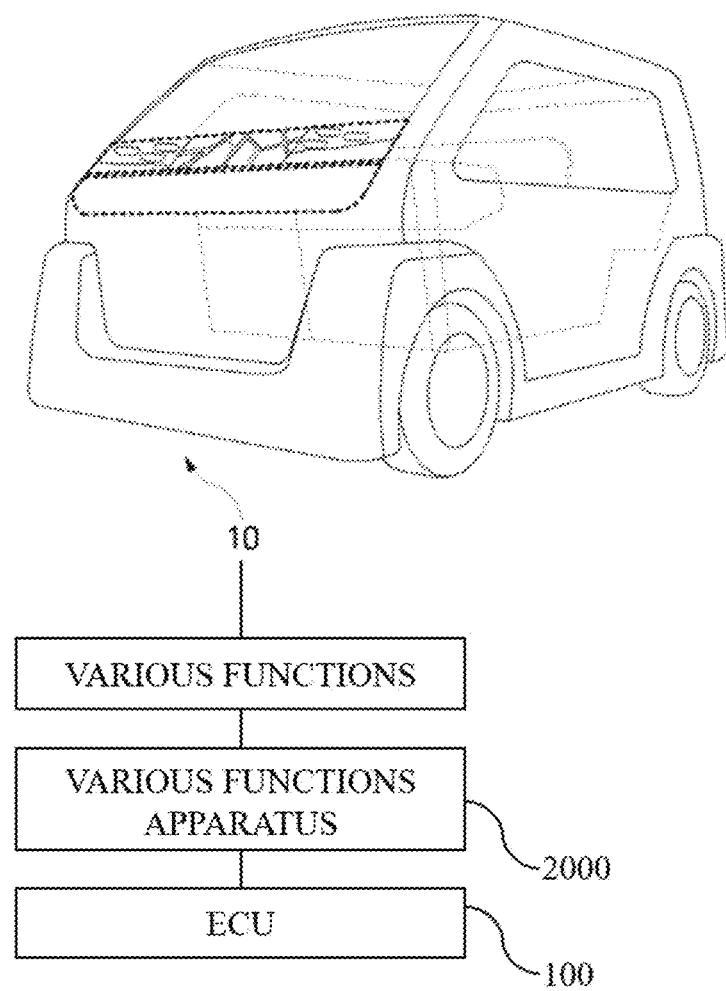
FIG. 13 is a view for basically describing a vehicle function operation apparatus according to a second embodiment of the present invention.

Referring to FIG. 13, a vehicle function operation apparatus 2000 functions as a controller configured to operate various functions of a vehicle 10 as in the above-described embodiment. The vehicle function operation apparatus 2000 may be controlled by an electronic control unit (ECU) 100.

As part of satisfying the user's behavioral conditions in the autonomous traveling environment, the vehicle function operation apparatus 2000 configures a separate position variable operation system in order to apply various traveling modes. In particular, the vehicle function operation apparatus 2000 is different from the above-described embodiment in that separate symbols (icons, widgets, and marks) are projected.

Figure 14:
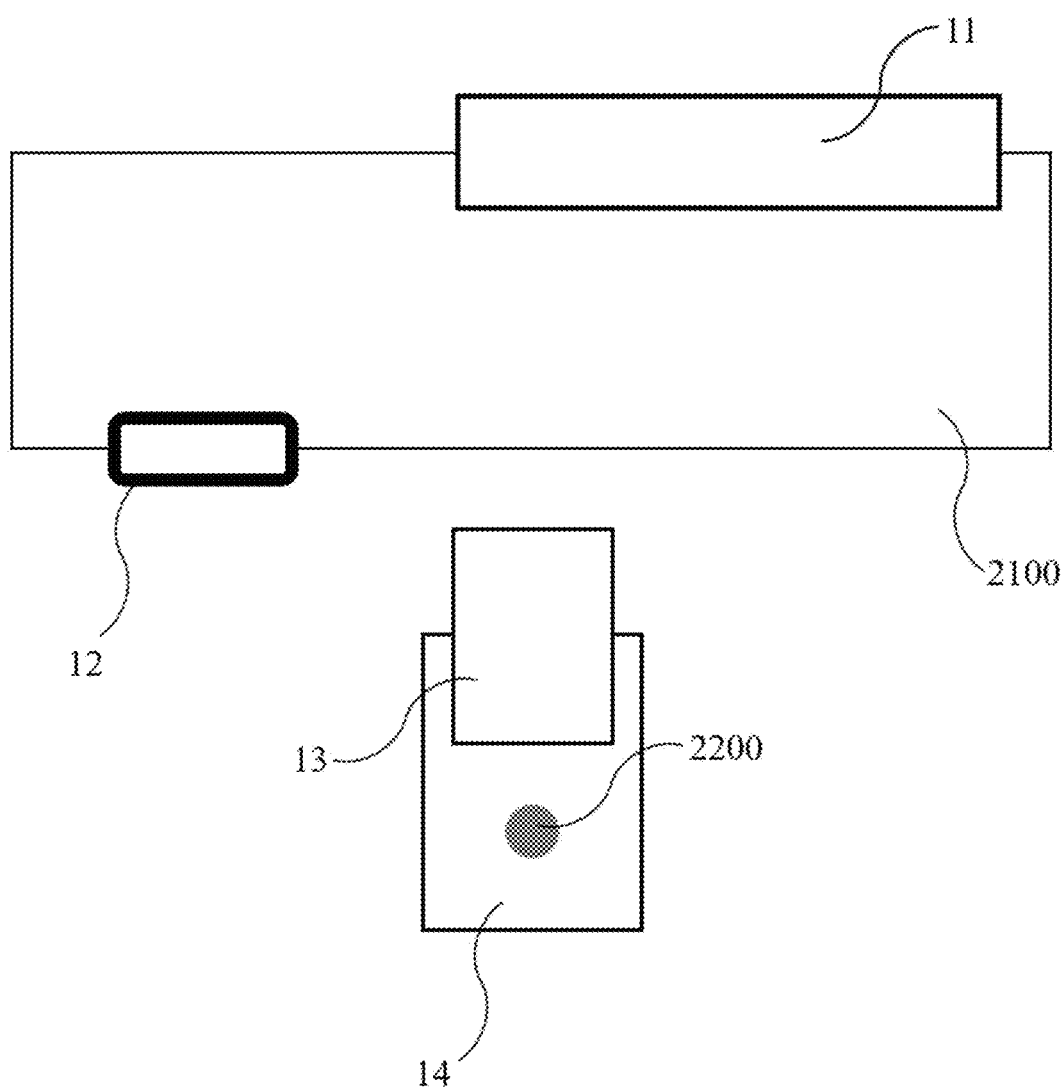
FIG. 14 is a configuration view schematically showing the vehicle function operation apparatus according to the second embodiment of the present invention.

Referring to FIG. 14, the vehicle function operation apparatus 2000 largely includes a matching table 2100 and a position variable knob dial 2200.

The matching table 2100 displays icons for each of various in-vehicle functions for each area. Basically, the matching table 2100 is positioned between a display 11 and a steering wheel 12 on a cockpit module as shown, but is not limited thereto and may be positioned in any area in the vehicle.

The knob dial 2200 is electrically linked with the icon displayed on the matching table 2100 to enable a detailed function operation of the corresponding icon. The knob dial 2200 projects a widget for each detailed function of the corresponding icon on a contact area with the matching table 2100.

When the knob dial 2200 is mounted in a console 14, overall in-vehicle system management (various convenience functions, traveling control, and the like) is possible through a basic dial operation. Here, the knob dial 2200 may be simply mounted or configured as a pop-up type.

Figure 15:
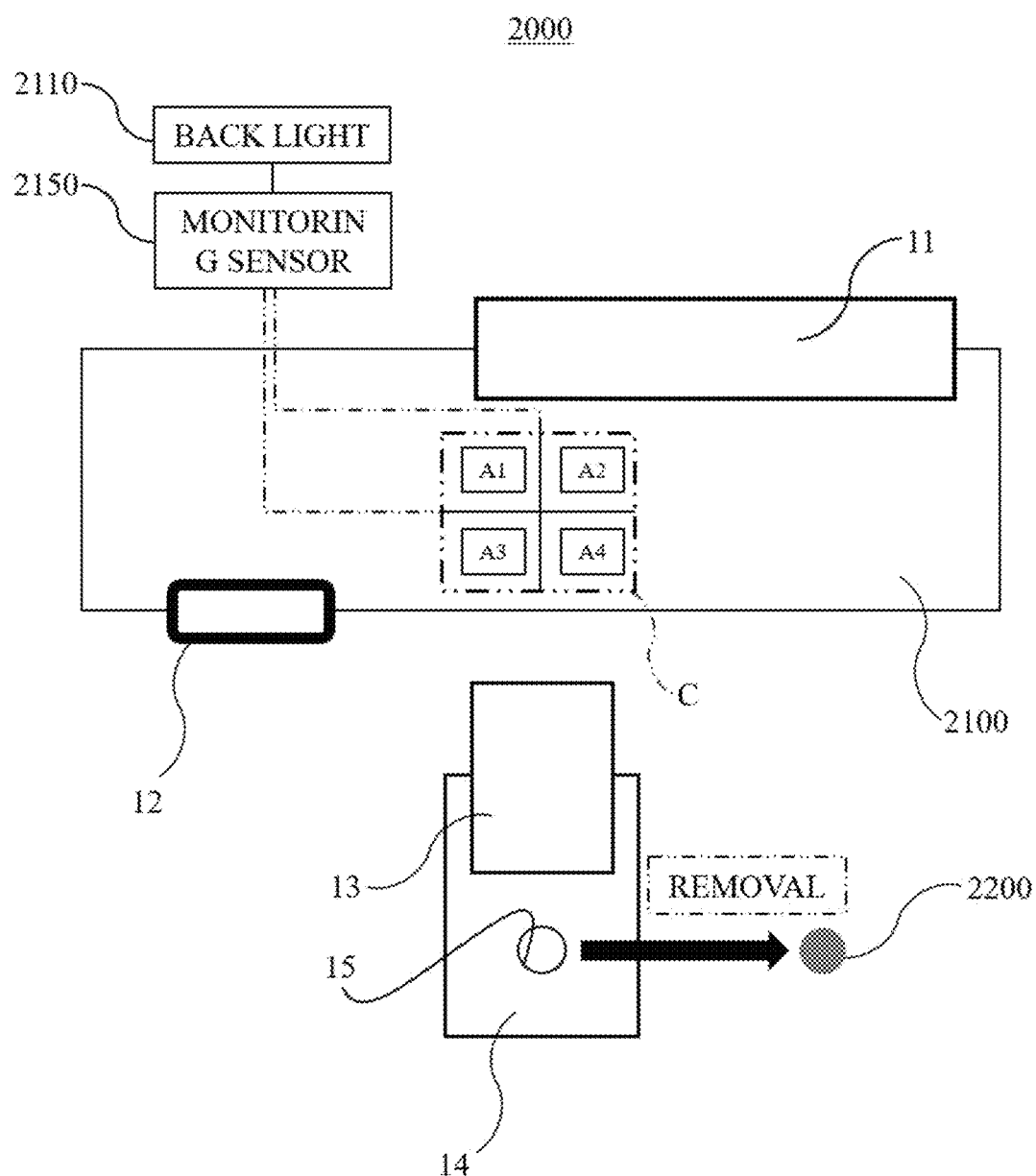
FIG. 15 is an operation exemplary view schematically showing the vehicle function operation apparatus according to the second embodiment of the present invention.
Figure 16:
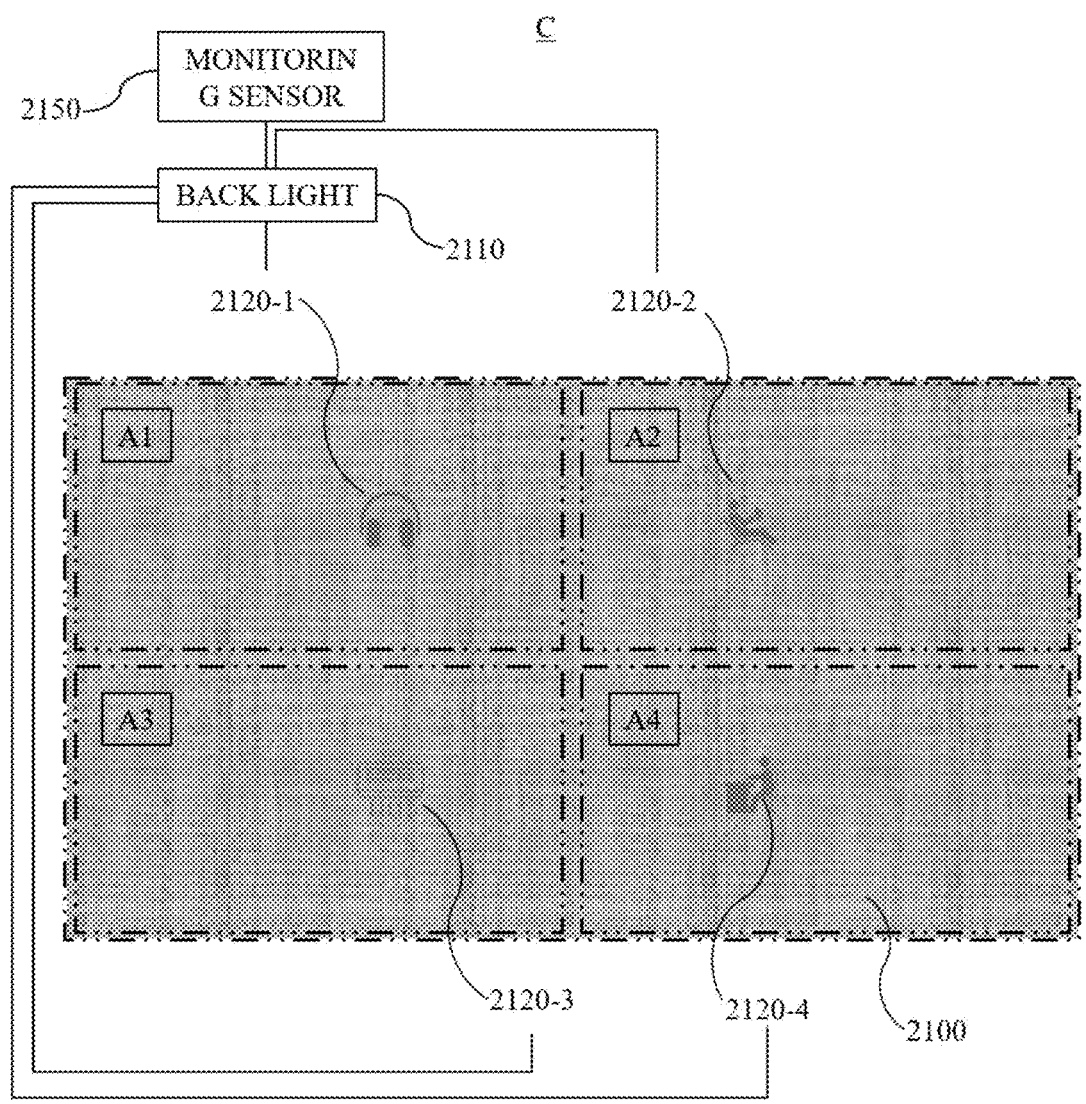
FIG. 16 is an enlarged view of portion C indicated in FIG. 15.

Referring to FIGS. 15 and 16, the matching table 2100 selectively displays the illumination for each position and function based on a backlight 2110 in the entire area.

When the matching table 2100 comes into contact with the knob dial 2200, the illumination of the backlight 2110 is activated for only a corresponding icon 2120-1 of an area (any one place among A1, A2, A3, and A4) in which the knob dial 2200 is positioned, and the illumination of the backlight 2110 for remaining icons 2120-2, 2120-3, and 2120-4 is deactivated.

At this time, the matching table 2100 includes a monitoring sensor 2150 configured to partition the area for each icon 2120-1, 2120-2, 2120-3, and 2120-4 on an upper end surface.

The knob dial 2200 is positioned in a preset mounting area 15 in the vehicle and comes into contact with the matching table 2100 after being removed from the mounting area 15. When the linkage between the knob dial 2200 and the matching table 2100 is deactivated, the knob dial 2200 may be mounted on and stored in the mounting area 15.

The knob dial 2200 has a built-in battery (not shown) having a predetermined capacity, so that when the knob dial 2200 is mounted on the mounting area 15, the battery may be charged wirelessly.

Basically, the knob dial 2200 is detachably mounted in the console 14 linked with a main operation system 13, but has a variable position structure that is linked with the matching table 2100 outside the mounting area 15 when necessary.

In particular, the knob dial 2200 may be positioned in any area in the vehicle including a crash pad and a door trim in addition to the shown console 14.

Figure 17:
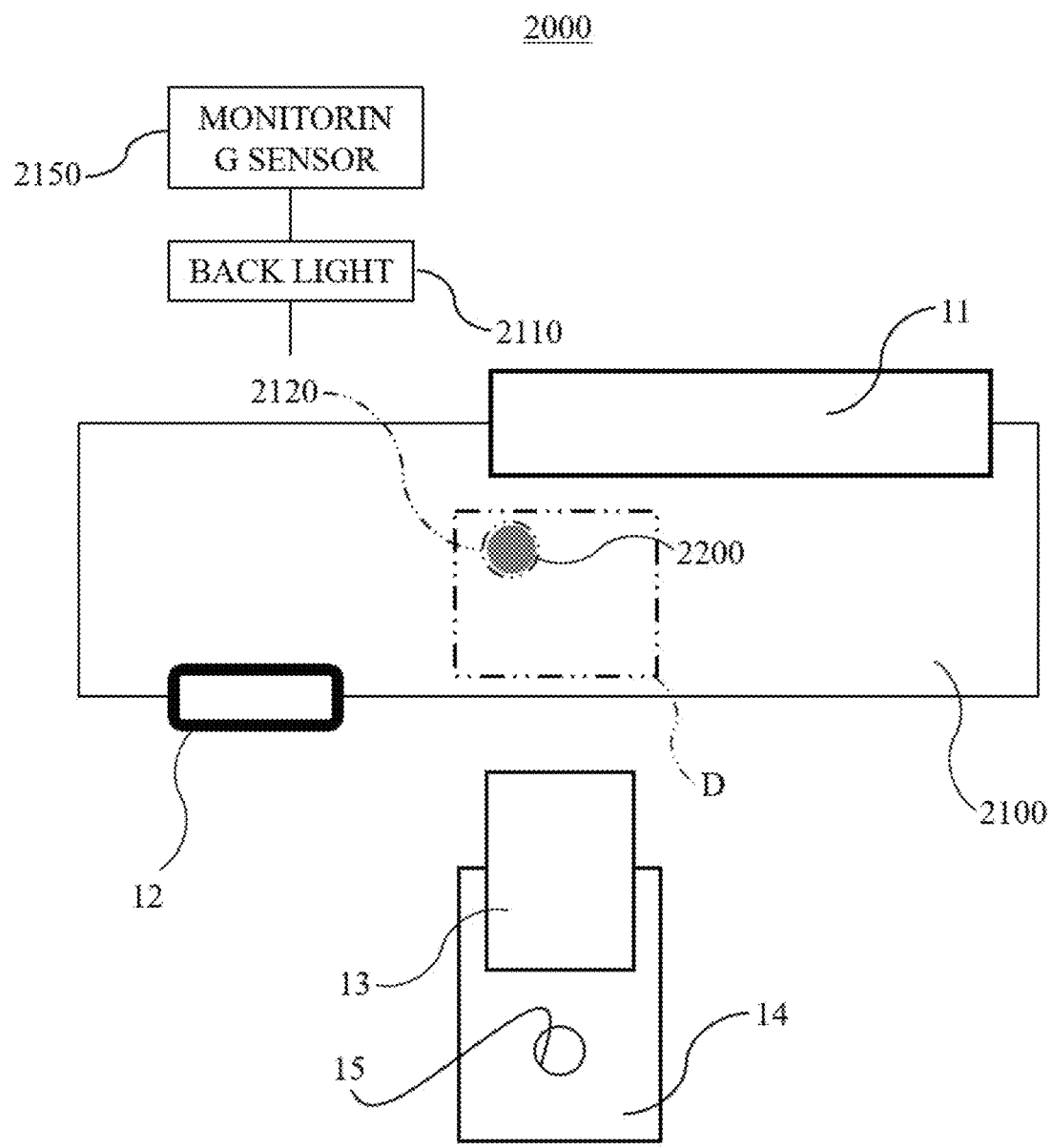
FIG. 17 is an operation exemplary view schematically showing a state in which a matching table and a knob dial are linked in the vehicle function operation apparatus according to the second embodiment of the present invention.
Figure 18:
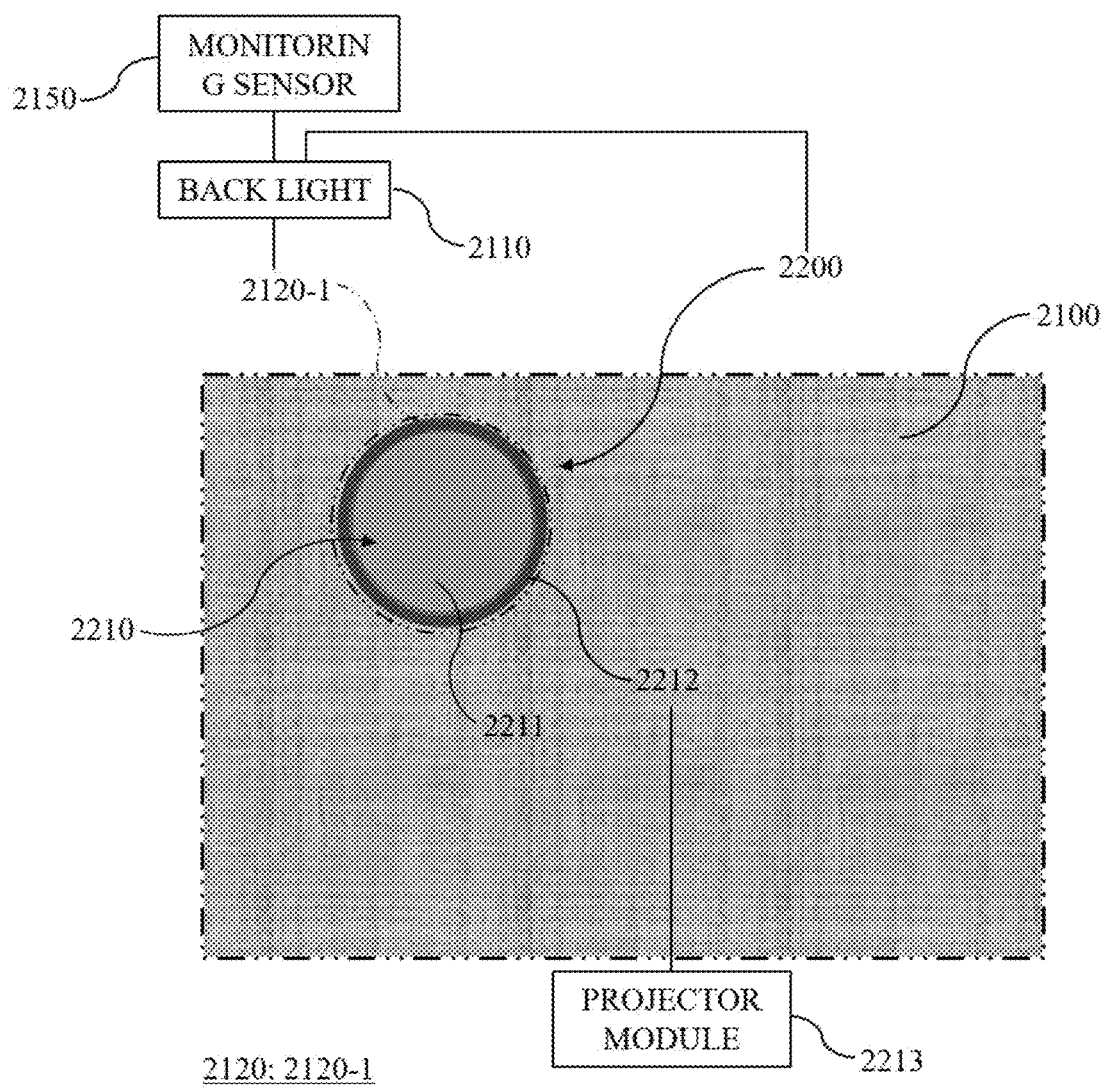
FIGS. 18 and 19 are operation exemplary views of the matching table and the knob dial shown based on portion D indicated in FIG. 17.
Figure 19:
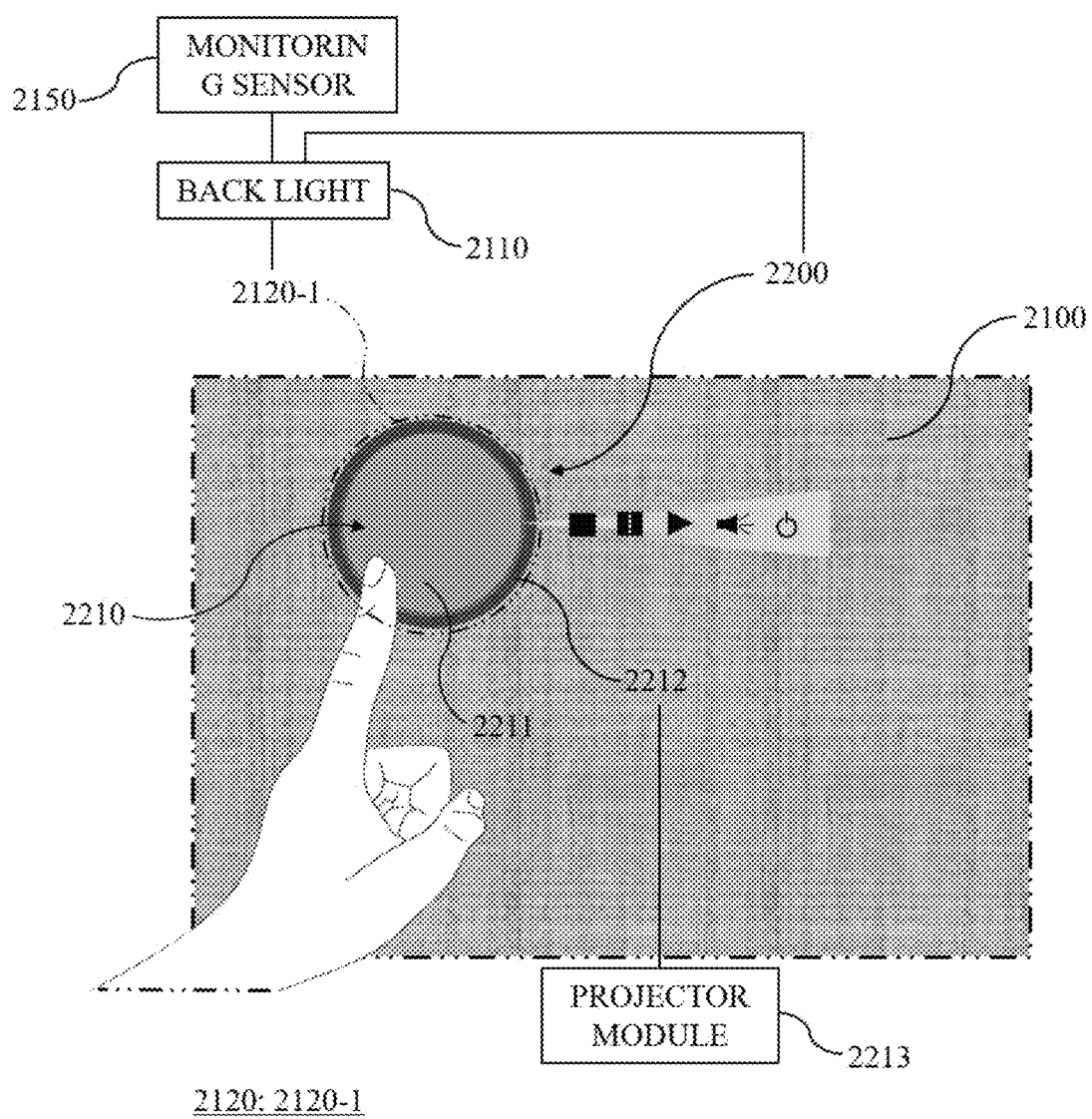

Referring to FIGS. 17 to 19, when the matching table 2100 comes into contact with the knob dial 2200, only the corresponding icon 2120-1 of the area where the knob dial 2200 is positioned is displayed and the remaining icons are hidden. In other words, a backlight illumination is turned on for only the corresponding icon 2120-1 of the matching table 2100 linked with the knob dial 2200, and the backlight illumination is turned off for the remaining icons for convenience.

At this time, the knob dial 2200 linked with the matching table 2100 may also be changed to a specific color in order to confirm an identification with a naked eye. This is to confirm with the naked eye that the knob dial 2200 and the matching table 2100 has been linked. The color of the knob dial 2200 may be selectively changed.

As a modified example, when the matching table 2100 comes into contact with the knob dial 2200, only the corresponding icon in the area where the knob dial 2200 is positioned may be displayed with a different color.

The knob dial 2200 is different from the knob dial (1200 in FIGS. 1 to 12) for hiding or expressing the corresponding symbols (icons, widgets, and marks) in that it projects icons, widgets, and marks.

In other words, the knob dial 2200 in the second embodiment is the same as the above-described knob dial (1200 in FIGS. 1 to 12) in that it largely includes a dial unit 2210, a housing (not shown), and a linkage switch (not shown), but a detailed configuration thereof is different. Hereinafter, only a configuration different from that of the knob dial (1200 in FIGS. 1 to 12) in the first embodiment will be described, and the same overlapping configuration will be omitted.

The dial unit 2210 of the knob dial 2200 includes a touch portion 2211, a dial portion 2212, and a projector module 2213.

The touch portion 2211 functions as a switch that physically enables a depressing operation. The touch portion 2211 may be changed to a preset backlight color when the knob dial 2200 is linked with the matching table 2100.

In addition, the touch portion 2211 may also display the corresponding widget on the touch area separately from the widget for each detailed function of the icon displayed on the matching table 2100.

The dial portion 2212 may rotate and select the widget for each detailed function of the selected icon displayed on the matching table 2100 while surrounding an outer circumferential surface of the touch portion 2211. Of course, the dial portion 2212 may also rotate and select the widgets displayed on the touch portion 1211.

A corresponding function of the widget selected through the dial portion 2212 may be performed by the depressing operation of the touch portion 2211.

The projector module 2213 is connected to the dial portion 2212 and comes into contact with the matching table 2100 to project the widget for each detailed function of the corresponding icon 2120-1.

Here, the dial portion 2212 may include an around slit (not shown) formed along the outer circumferential surface so that the beam of the projector module 2213 may be projected over the entire area (360 degrees).

As shown in FIG. 19, the beam of the projector module 2213 projects a plurality of widgets by arranging the plurality of widgets in a straight shape, but the present invention is not limited thereto. Accordingly, the beam of the projector module 2213 may also project the plurality of widgets by arranging the plurality of widgets in a curved shape.

Figure 20:
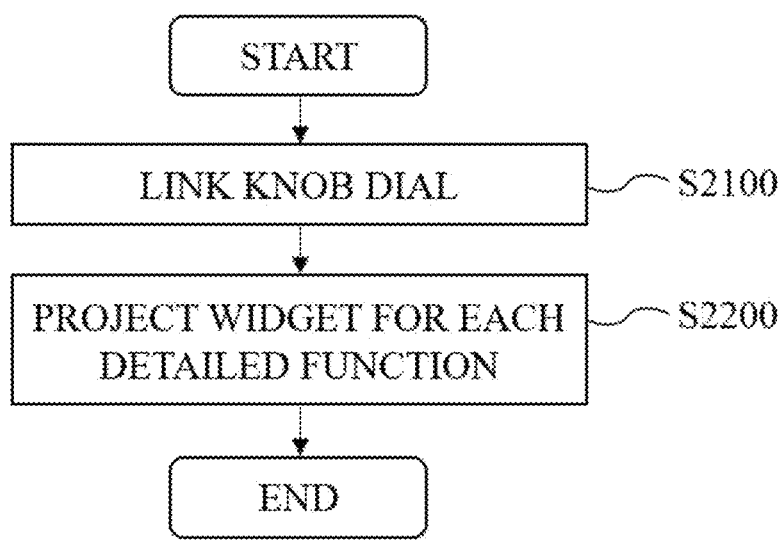
FIG. 20 is a flowchart showing a vehicle function operation method according to the second embodiment of the present invention.

Referring to FIG. 20, a vehicle function operation method according to the second embodiment largely includes a knob dial linking operation (S2100) and an operation of projecting a widget for each detailed function (S2200).

First, in the knob dial linking operation (S2100), the position variable knob dial comes into contact with and is electrically linked with the matching table in which the icons for each of various functions in the vehicle are displayed for each area.

The knob dial linking operation (S2100) includes a knob dial separating operation (S2110) and a knob dial connecting operation (S2120).

In the knob dial separating operation (S2100), the knob dial mounted on the preset mounting area in the vehicle is removed from the mounting area. At this time, when the knob dial is removed from the mounting area, the matching table turns on the backlight illumination to display the icons for each of various functions of the vehicle. Here, in the knob dial separating operation (S2110), the knob dial may be removed from the mounting area in a state in which a power source between the mounting area and the knob dial has been deactivated.

In the knob dial connecting operation (S2120), the knob dial removed (separated) from the mounting area is brought into contact with the matching table to electrically link the knob dial with the matching table.

In the knob dial connecting operation (S2120), when the knob dial is linked with the matching table, the knob dial may be changed to a preset backlight color. At this time, a setting that changes the knob dial to the corresponding backlight color is possible as an option.

Next, in the operation of projecting the widget for each detailed function (S2200), the widget for each detailed function of the corresponding icon positioned on the contact area with the matching table is projected by the knob dial linked with the matching table.

The operation of projecting the widget for each detailed function (S2200) includes a projection type selecting operation (S2210) and an operation of selecting and controlling the widget for each detailed function (S2220).

In the projection type selecting operation (S2210), a straight or curved projection type is selected for the widget for each detailed function of the corresponding icon displayed on the matching table. The corresponding operation (S2210) may basically designate a beam projection type and also arbitrarily select the beam projection type as an option.

In the operation of selecting and controlling the widget for each detailed function (S2220), the widget for each detailed function of the icon is selected by the operation of the knob dial operated in a touch and rotation manner, so that the corresponding function may be selectively controlled.

The present invention is not limited to the above-described embodiments, and may be variously modified and practiced without departing from the technical spirit of the present invention.

What is claimed is:

1. A vehicle function operation apparatus comprising:
a matching table configured to display an icon for each of various in-vehicle functions for each area among a plurality of areas of matching table; and
a position variable knob dial configured to be movable from a preset mounting area different from the matching table in a vehicle to contact one area among the plurality of areas of the matching table to be electrically linked with the matching table so as to project a widget for one detailed function of the corresponding icon positioned on the one area among the plurality of areas of the matching table,
wherein the matching table includes a monitoring sensor configured to partition an area for each icon on an upper end surface of the matching table,
the matching table selectively displays an illumination for each position and function based on a backlight over the plurality of areas of the matching table, and
the matching table activates a backlight illumination only for the corresponding icon of the one area among the plurality of areas where the knob dial is positioned and deactivates backlight illuminations for the remaining icons when coming into contact with the knob dial.

2. The vehicle function operation apparatus of claim 1, wherein the knob dial is configured to be positioned in the preset mounting area in the vehicle, come into contact with the matching table after being removed from the preset mounting area, and be mounted on and stored in the preset mounting area when a linkage with the matching table is deactivated.

3. The vehicle function operation apparatus of claim 2, wherein the knob dial has a built-in battery having a predetermined capacity to be wirelessly charged when the knob dial is mounted on the preset mounting area.

4. The vehicle function operation apparatus of claim 2, wherein the knob dial is provided with a non-slip pad capable of preventing slippage on a lower end surface of a housing.

5. The vehicle function operation apparatus of claim 1, wherein the knob dial includes:
a dial unit configured to enable a detailed function operation of the corresponding icon displayed on the matching table in a touch and rotation manner;
a housing configured to surround a lower portion of the dial unit; and
a linkage switch positioned on a lower end of the housing to determine a linkage between the matching table and the knob dial depending on whether the knob dial comes into contact with the matching table.

6. The vehicle function operation apparatus of claim 5, wherein the dial unit includes:
a touch portion configured to physically enable a depressing operation; and
a dial portion configured to enable rotation in a state of surrounding an outer circumferential surface of the touch portion, and
the dial portion projects a widget for each detailed function of the corresponding icon displayed on the matching table.

7. The vehicle function operation apparatus of claim 5, wherein the dial unit includes:
a touch portion configured to physically enable a depressing operation; and
a dial portion configured to enable rotation in a state of surrounding an outer circumferential surface of the touch portion, and
wherein the dial portion includes:
a projection module configured to project the widget for each detailed function of the corresponding icon displayed on the matching table; and
an around slit disposed along an outer circumferential surface so that a beam of the projector module is projected over the entire area.

8. The vehicle function operation apparatus of claim 7, wherein the projector module projects a plurality of widgets by arranging the plurality of widgets in a straight or curved shape.

9. The vehicle function operation apparatus of claim 1, wherein the preset mounting area includes an area among a console, a door trim, and a crash pad in the vehicle.

10. A vehicle function operation apparatus comprising:
a matching table configured to display an icon for each of various in-vehicle functions; and
a position variable knob dial electrically linked when coming into contact with the matching table to enable a detailed function operation of the icon displayed on the matching table,
wherein when coming into contact with the knob dial, the matching table displays only the corresponding icon of an area where the knob dial is positioned and hides the remaining icons, and displays a widget for each detailed function of the corresponding icon around the knob dial.

11. The vehicle function operation apparatus of claim 10, wherein the matching table selectively displays an illumination for each position and function based on a backlight over the entire area of the matching table.

12. The vehicle function operation apparatus of claim 10, wherein the matching table partitions a displayed position of the icon for each preset area of the matching table.

13. The vehicle function operation apparatus of claim 10, wherein the matching table arbitrarily displays a position of the icon by an operation of the knob dial.

14. The vehicle function operation apparatus of claim 10, wherein the knob dial includes:
a dial unit configured to enable a detailed function operation of the corresponding icon displayed on the matching table in a touch and rotation manner;
a housing configured to surround a lower portion of the dial unit; and
a linkage switch positioned on a lower end of the housing to determine a linkage between the matching table and the knob dial depending on whether the knob dial comes into contact with the matching table.

15. The vehicle function operation apparatus of claim 14, wherein the dial unit includes:
a touch portion configured to physically enable a depressing operation; and
a dial portion configured to rotate and select the widget for each detailed function of the corresponding icon displayed on the matching table in a state of surrounding an outer circumferential surface of the touch portion, and
the corresponding function of the widget selected through the dial portion is performed by the depressing operation of the touch portion.

16. The vehicle function operation apparatus of claim 15, wherein the touch portion is changed to a preset backlight color when the knob dial is linked with the matching table.

17. A vehicle function operation method comprising:
(a) an operation of removing a position variable knob dial knob dial mounted on a preset mounting area different from a matching table in a vehicle;
(b) an operation of bringing the knob dial removed from the preset mounting area into contact with one area among a plurality of areas of the matching table to be electrically linked the knob dial with the matching table;
(c) an operation of displaying an icon for one of various in-vehicle functions for the one area among a plurality of areas of the matching table by activating a backlight illumination only for the corresponding icon of the one area among the plurality of areas where the knob dial is positioned and deactivating backlight illuminations for the remaining icons; and
(d) an operation in which the knob dial linked with the matching table projects a widget for each detailed function of the corresponding icon positioned on the one area among the plurality of areas of the matching table.

18. The method of claim 17, wherein the operation (d) includes:
an operation of selecting a projection type of a straight or curved shape for the widget for each detailed function of the corresponding icon displayed on the matching table; and
an operation of selecting the widget for each detailed function of the icon and selectively controlling the corresponding function by the operation of the knob dial operated in a touch and rotation manner.

* * * * *